United States Patent [19]

Lane, Jr.

[11] Patent Number: 5,690,356
[45] Date of Patent: Nov. 25, 1997

[54] INTEGRATED SWITCH FOR AIR BAG DEACTIVATION

[75] Inventor: Wendell Lane, Jr., Romeo, Mich.

[73] Assignee: AlliedSignal Inc., Morristown, N.J.

[21] Appl. No.: 745,520

[22] Filed: Nov. 12, 1996

Related U.S. Application Data

[63] Continuation of Ser. No. 565,458, Nov. 30, 1995, abandoned.

[51] Int. Cl.$^6$ ................................................ B60R 21/32
[52] U.S. Cl. ..................................... 280/735; 180/273
[58] Field of Search ................................ 280/734, 735; 180/273

[56] References Cited

U.S. PATENT DOCUMENTS

| | | | |
|---|---|---|---|
| 5,454,591 | 10/1995 | Mazur et al. | 280/735 |
| 5,468,014 | 11/1995 | Gimbel et al. | 280/735 |
| 5,474,327 | 12/1995 | Schousek | 280/735 |
| 5,515,933 | 5/1996 | Meyer et al. | 180/273 |

FOREIGN PATENT DOCUMENTS

| | | |
|---|---|---|
| 0 603 733 A | 6/1994 | European Pat. Off. . |
| 0 721 863 A | 7/1996 | European Pat. Off. . |
| 42 28 624 A | 3/1994 | Germany . |
| 44 26 677 A | 2/1995 | Germany . |
| 44 09 971 A | 9/1995 | Germany . |

OTHER PUBLICATIONS

Research Dsiclosure No. 3838, "Rear Facing Infant Seat Detection Device".
Research Disclosure No. 34457, "Air Bag Inhibitor for use with Infant Seat".
Machine Design, Nov. 7, 1994, "Sensor protects infants from airbag injuries".

*Primary Examiner*—Kenneth R. Rice
*Attorney, Agent, or Firm*—Markell Seitzman

[57] ABSTRACT

A safety system comprising: a passenger seat (10) having fixed anchors (14) adapted to secure and retain a child seat (40;70); the child seat having clamps (50,52) for lockingly engaging a respective one of the anchors; and a switch (80,80') mounted in proximity to at least one of the anchors (14), having an active state and an inactive state, wherein when the clamp lockingly engages a corresponding anchor the state of the switch is changed to provide an indication that a child seat has been installed.

10 Claims, 2 Drawing Sheets

INTEGRATED SWITCH FOR AIR BAG DEACTIVATION

This application is a continuation of application Ser. No. 08/565,458 filed Nov. 30,1995, now abandoned.

BACKGROUND AND SUMMARY OF THE INVENTION

The present invention relates to automotive safety systems and more particularly to a device for automatically deactivating an air bag or air bag inflator when a child seat has been installed in a passenger seat.

Child seats are subject to relatively high forces that are transferred to the infant upon deployment of an air bag. The primary purpose of the present invention is to deactivate or control the activation of an air bag when a child seat has been installed within a passenger seat; it is also applicable to front or rear facing child seats.

As is known in the art, a new type of anchorage system termed "isofix" has been proposed as an optional method of retaining a child seat to the vehicle by employing a set of fixed anchorage points. In the present invention a switch is incorporated into or adjacent at least one of these anchorage points. When the child seat is fixedly secured to the anchor points, the child seat self-engages the switch which in turn provides a signal to the air bag system. This signal can be used to deactivate other safety devices such as a pretensioner or belt tightener associated with the passenger seat if the vehicle is so equipped.

One means currently proposed is to deactivate the air bag by providing a manual switch which is toggled or moved by an adult after the child seat has been installed within the vehicle. The deficiency of this type of arrangement is that system reliability may be reduced if the adult does not take the proper action once the child seat is installed.

It is an object of the present invention to provide a simple, reliable and cost effective means which does not need the active involvement of an adult. Accordingly the invention comprises: a passenger seat having fixed anchors adapted to secure and retain a child seat; the child seat having clamp means for lockingly engaging the anchors; and switch means mounted in proximity to at least one of the anchors, having an active state and an inactive state, wherein when the clamp means lockingly engages a corresponding anchor the state of the switch means is changed to provide an indication that a child seat has been installed.

Many other objects and purposes of the invention will be clear from the following detailed description of the drawings.

DETAILED DESCRIPTION OF THE DRAWINGS

Figure 1:
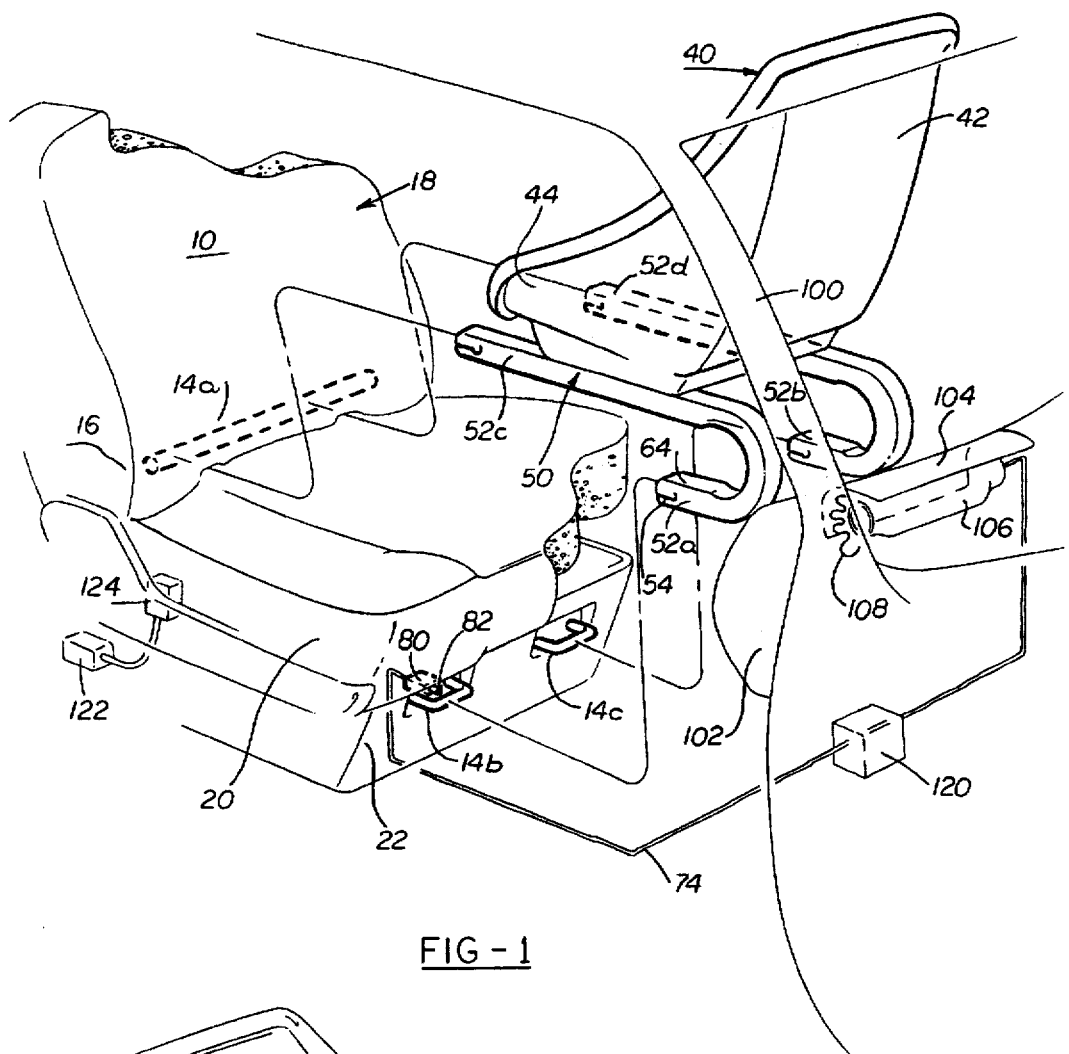
FIG. 1 illustrates a projected view of the vehicle passenger seat and child seat.

Reference is made to FIG. 1 which illustrates a conventional passenger seat 10 modified by the "isofix" anchors. As can been seen, these anchors comprise a plurality of straight or U-shaped bars 14a–c physically joined to a structural portion of the seat. In one embodiment a straight bar 14a is located proximate the lower end 16 of the seat back 18. Two other U-shaped anchors 14b and 14c are located proximate the front of the seat bottom 20. These anchors are within a recess in the front 22 of the seat to avoid being contacted by the occupant's lower legs or ankles. Also shown in FIG. 1 is an illustrative rear facing child seat 40, the details of which are not particularly important. The child seat includes a backrest 42 and a seat portion 44 mounted to a frame 50. The frame 50 includes four locking clamps 52a–d. Two of these locking clamps, such as 52c and 52d, lockingly engage bar 14a while the other locking clamps 52a and 52b lockingly engage bars 14b and 14c. FIG. 1 further shows a portion of the vehicle such as the A-pillar 100, the instrument panel 102, deployment door 104, inflator 106 and an air bag 108 positioned nearby.

Figure 2:
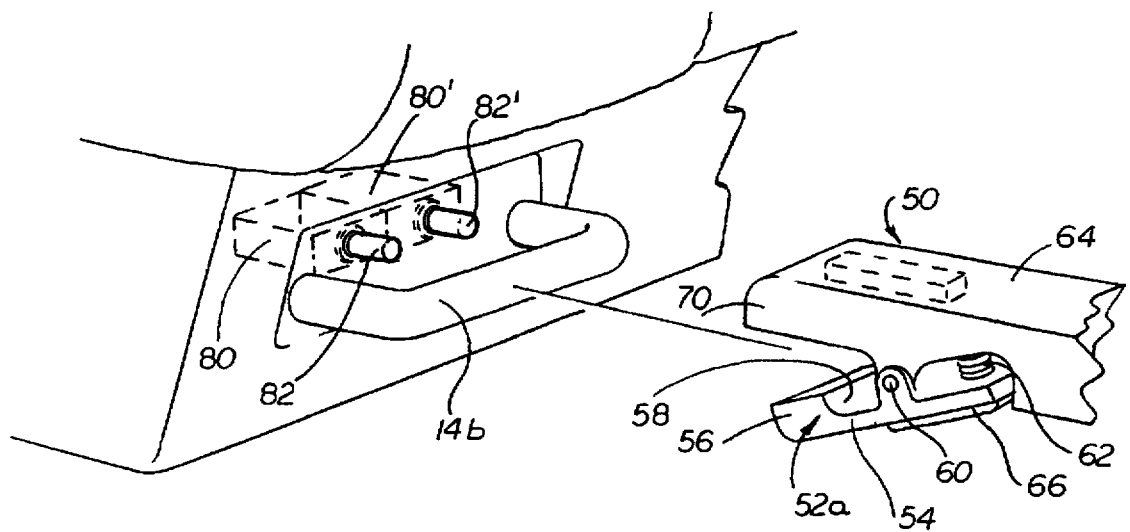
FIG. 2 is an enlarged view of a portion of FIG. 1.
Figure 3:
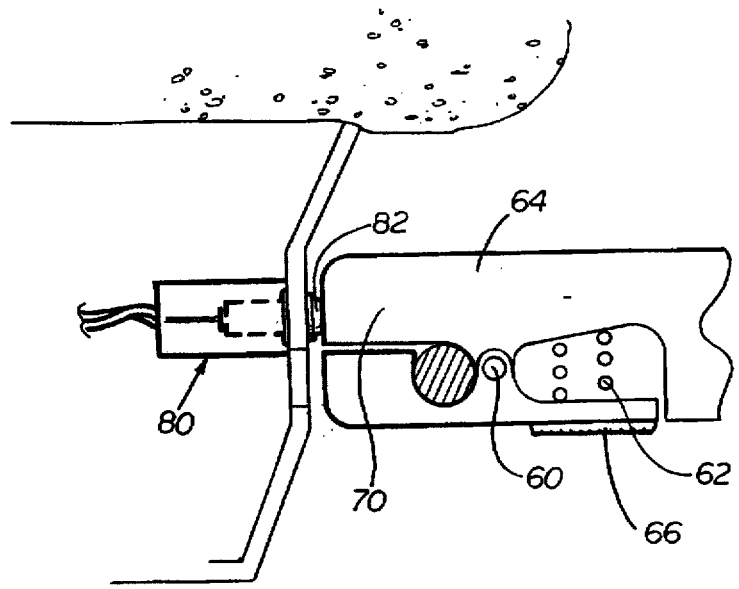
FIG. 3 shows a clamping member about an anchorage point.

FIG. 2 is an exploded, enlarged view of one such locking clamp 52a. It should be appreciated that each of the other locking clamps 52b–d are identical. The locking clamp comprises an articulated bar 54 having a curved end 56 which defines a socket 58 to receive and lock with an associated one of the anchors 14a–c. The bar 54 is rotatable about a pivot 60 and spring biased by spring 62 against a top bar 64. When the child seat 40 is installed the claps end 66 of bar 54, thereby opening the locking clamp 52a to allow it to slide about a respective one of the bars or anchors 14a–c. Upon release of the end 66 the clamping end achieves a locking engagement about the anchor as illustrated in FIG. 3. FIGS. 2 and 3 also show one or more electrical switches 80 and 80' which are discussed below.

Figure 4:
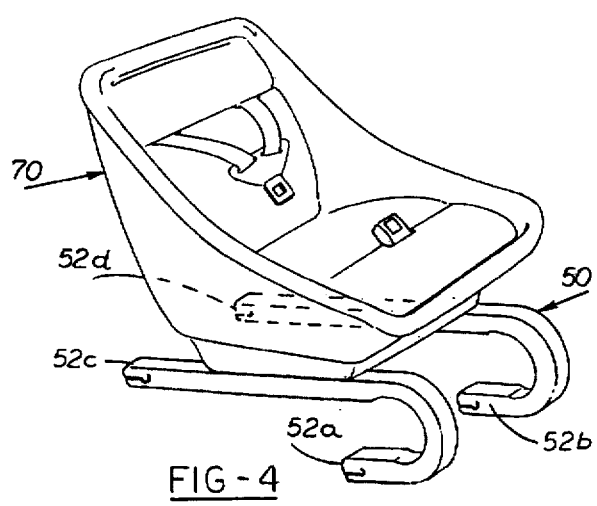
FIG. 4 shows a front facing child seat.

FIG. 4 illustrates a front facing child seat 70 equipped with a like frame 50 with a plurality of locking clamps 52a–d.

Reference is again made to FIG. 1. As can be seen, at least one electromechanical proximity switch 80 is installed proximate one or more of the fixed anchors 14a–c. In FIG. 1 a single switch 80 is located on the seat bottom within anchor 14b. As is known, this type of switch has an active and deactivated mode of operation corresponding to the position of its spring loaded plunger 82. Whether the switch 80 opens or closes a cooperating electric circuit to generate an output signal is unimportant to the present invention and left to the particular application. When a child seat 40 or 70 is in place a forward end, such as 70, of a locking clamp 52a–d engages the switch plunger 82 causing the switch to change its electrical state thereby providing an indication (a control signal or lack thereof), via wires 74 to an electronic control unit 120 that a child seat is installed within the passenger seat 10. Alternatively, the switch can be a magnetic switch, a magnet and read switch or a capacitive proximity switch. As mentioned above the switch is communicated to the electronic control unit 120 which controls the deployment of associated safety devices such as an air bag inflator 106 and a pretensioner 122 associated with a buckle 124 or retractor. The presence of a child-seat-installed indication signal is used by the ECU 120 to, for example, prevent or control the activation of these types of safety devices.

It is generally recognized that when a rear facing child seat 40 is installed in certain vehicles it may be desirable to prevent the activation of an associated air bag during an accident. In other vehicles it might be desirable to modify the inflation characteristics of the air bag. If, on the other hand, a forward facing child seat 70 is used it may be desirable to modify the operation of the air bag to accommodate the child seat. In any case the electrical switch mechanism, either alone or in combination with the child seat, must be capable of differentiating between a front and rear facing seat so that the ECU 120 can control (or modify) the inflation characteristics of the air bag. This can simply be accomplished by providing a second switch 80' adjacent switch 80 or near another anchor such as 14c. In addition, one or more locking clamps such as 52a or 52b needs to be modified so that it is only possible to selectively activate the switches 80 and/or 80' in a manner to indicate which child seat is installed. As an example, FIG. 2 is shows switches 80 and 80' installed side-by-side adjacent anchor 14b. In addition, let it be assumed that the frame 50 is for a rear facing child seat 40. In this configuration the right side of the top bar 64 would include a cut-out or alternately an oversized bore 72 that prohibits the activation of plunger 82'. The frame of a front facing child seat 70 would include the opposite configuration that is a cut-out or bore 72 on the left of the bar 64 such that plunger 82 is not activated. As can be appreciated many alternate configurations can be developed depending on switch location and the type of switch used. Another type of front facing child seat called a booster seat could be used for a child of weight and stature too large for the normal front facing child safety seat.

It was mentioned above the inflation rate of the air bag can be modified, that is slowed when compared to the rate used to protect a larger occupant. As is known in the art, certain air bag inflators, such as 106, include more than one electrically responsive heat generating device which includes a detonator and a known quantity of propellant. Consider the operation of a hybrid or augmented air bag inflator which contains a quantity of stored inflation gas such as Argon with, for example, two detonators and corresponding different quantities of propellant. The inflation rate of the air bag corresponds to how quickly the stored gas is heated by the burning propellant which in turn depends on the quantity of propellant. In this situation when a front facing child seat, for example, is identified as being installed, the ECU 120 activates the detonator which will produce a low initial inflation rate. Subsequently the other of the detonators can be activated to increase the rate of inflation if desired.

As can be appreciated the ECU can also generate an audible or visual signal to the vehicle operator that the air bag or inflator is or has been deactivated as a result of installing a rearward or forward facing child seat or alternatively, that the rate of inflation has been modified due to the installation of a forward facing child seat. If this signal indication does not correspond to the actual child seat installation, the vehicle operator can also be instructed to move the child seat to a rear, non-air bag protected seat of the vehicle until the car is properly serviced.

Future safety restraint systems may include air bags located in backs of the front seats to provide frontal impact protection enhancement to rear seat passengers. The same issues with rear facing infant safety seats could be overcome with this invention, since the present invention is applicable to rear seat installation.

With the advent of side impact air bags, it may be beneficial to deactivate, delay, or modify the deployment of a side impact air bag if a child safety seat is present. The present invention would allow the ECU to sense and determine appropriate control logic for the S.I.B.

Many changes and modifications in the above described embodiment of the invention can, of course, be carried out without departing from the scope thereof. Accordingly, that scope is intended to be limited only by the scope of the appended claims.

I claim:

1. A safety system comprising:

a passenger seat (10) having fixed anchors (14) adapted to secure and retain a child seat (40;70);

the child seat having clamp means (50,52) for lockingly engaging the anchors;

switch means (80,80') mounted in proximity to at least one of the anchors (14), having an active state and an inactive state, wherein with the clamp means lockingly engaging a corresponding anchor the state of the switch means is changed to provide an indication that a child seat has been installed.

2. The system as defined in claim 1 wherein the switch means includes first means capable of discriminating between different types of child seats including a front facing child seat and a rear facing child seat.

3. The system as defined in claim 1 including an air bag and inflator, wherein the operation of the inflator is modified in accordance with the installation of the child seat.

4. A safety system comprising:

a passenger seat (10) having at least one first connector part (14) lockingly engageable with a second connector part on a child seat;

switch means (80,80') mounted in proximity to at least one first connector part (14), having an active state and an inactive state, wherein with the second connector part lockingly engaging a corresponding first connector part the state of the switch means is changed to provide an indication that a child seat has been installed.

5. The system as defined in claim 4 wherein the switch means includes first means capable of discriminating between different types of child seats including a front facing child seat and a rear facing child seat.

6. The system as defined in claim 4 including an air bag and inflator, wherein the operation of the inflator is modified in accordance with the installation of the child seat.

7. The system as defined in claim 4 wherein the first connector part includes one of an anchor and a clamp and the second connector part includes the other of the clamp and the anchor.

8. The system as defined in claim 4 wherein the seat includes a plurality of first connector parts engageable with a like plurality of second connector parts on the child seat.

9. A safety system comprising:

a child seat having at least one interlocking first connector part (50,52) for lockingly engaging a mating corresponding interlocking second connector part installed within a vehicle seat, the child seat including a portion whereby upon mating of the child seat to the vehicle seat the portion engages with switch means (80,80') mounted in proximity to the mating second connector part (14), the switch means having an active state and an inactive state, wherein with the connector parts lockingly engaged the state of the switch means is changed to provide an indication that a child seat has been installed.

10. A safety system comprising:

a passenger seat (10) having at least first connector (14) adapted to secure and retain a child seat (40;70);

the child seat having at least a second connector (50,52) for lockingly engaging with corresponding first connectors;

switch means (80,80') mounted in proximity to at least one of the first connectors (14), having an active state and an inactive state, wherein with the second connector lockingly engaging a corresponding first connector the state of the switch means is changed to provide an indication that a child seat has been installed.

* * * * *